United States Patent [19]

Tanaka

[11] Patent Number: 4,788,863

[45] Date of Patent: Dec. 6, 1988

[54] DEVICE FOR DETERMINING SWING SPEED OF ROTATABLE IMPLEMENTS

[75] Inventor: Yoshihisa Tanaka, Tokyo, Japan

[73] Assignee: Tanaka Manufacturing Co., Ltd., Tokyo, Japan

[21] Appl. No.: 124,205

[22] Filed: Nov. 23, 1987

[30] Foreign Application Priority Data

Nov. 29, 1986 [JP] Japan ............................ 61-184089[U]

[51] Int. Cl.$^4$ ........................... G01P 3/16; A63B 69/36
[52] U.S. Cl. ..................................... 73/493; 273/26 B; 273/186 A
[58] Field of Search ............ 73/493; 273/26 B, 186 A; 116/203, 223, 303; 200/61.45 M; 235/91 H

[56] References Cited

U.S. PATENT DOCUMENTS

3,113,781 12/1963 Guier ..................................... 73/493
4,526,036 7/1985 Morrison ................................ 73/493

FOREIGN PATENT DOCUMENTS

147609 8/1931 Switzerland ....................... 235/91 H

Primary Examiner—John Chapman
Attorney, Agent, or Firm—David H. Semmes

[57] ABSTRACT

A device for determining swing speed of rotatable implements, for example human activated sporting goods such as a bat, a tennis racquet, etc. The device comprises a mounting base, a magnetically attractable arcuately movable member in the form of a metal plate, a stopper, the movable member upon activation coming into contact with the stopper to produce a hitting sound, a support member detachably supporting the movable member, and a rotatable disk magnet likewise supported by the support member, the movable member being rotatably movable through a rotational arcuate width between the stopper and the support member. The device further comprises a counter which may be contacted by the movable member to detect numerical frequency of rotations of the movable member.

2 Claims, 4 Drawing Sheets

DEVICE FOR DETERMINING SWING SPEED OF ROTATABLE IMPLEMENTS

BACKGROUND OF THE INVENTION

1. Field of the Invention

The present invention relates to a device for determining the swing speed of rotatable implements such as human activated sporting goods, viz: a bat, a tennis racquet, etc.

2. Description of the Prior Art

To measure speed or the like at the time of swinging of sporting goods such as a golf club, a bat, a tennis racket, etc., there have been heretofore proposed devices which can be directly mounted on the goods. Such devices include, for example, a pointer-movable type in which a spring within the mounted device is extended by a centrifugal force produced at the time of swing to move a pointer, and after swinging has been finished, the spring is returned to its original position with the result that the pointer remains stopped at a position to which it has moved to determine the maximum centrifugal force (head speed) (see Japanese Utility Model Application Laid-open Nos. 60-7,858 and 60-32,972); a system in which the sound through the air is produced by air resistance caused by swinging (see Japanese Utility Model Application No. 60-30,267); and a system in which a propeller is provided, and a measured value is calculated from rotation of the propeller (see Japanese Patent Publication No. 51-10,536).

However, the above-described conventional devices have been proposed to measure a swing speed to calculate a distance covered or flown, or to merely decide whether or not a set swing speed was reached, but were not possible to find whether or not the maximum speed (maximum acceleration) was reached at a reasonable position in a swinging orbit. That is, there have been encountered problems wherein swinging in the proper form cannot be determined, and therefore, a player is apt to swing with all his strength and when measurement is made, his swing form tends to get out of shape.

SUMMARY OF THE INVENTION

The present invention has been achieved in view of those problems noted above with respect to prior art. According to the present invention, there is provided a device for determining swing speed, comprising a mounting base, a magnetically attractable movable member formed from a metal plate or the like, said movable member having one end pivotally mounted on said mounting base, a stopper provided on one of the rotational arcuate directions of said movable member, said movable member coming into contact with the stopper to produce a hitting sound, a support member provided on the other rotational direction of said movable member, said support member detachably supporting said movable member, said support member supporting a magnet part detachably attached to said movable member in manner such that the magnet part may be moved transversely in a longitudinal direction relation to the pivot of the movable member, said movable member being provided rotatably through a rotational width between said stopper and said support member. The present invention overcomes the aforementioned problems encountered in prior art. The swing speed deciding device of the present invention further comprises a counter which comes into contact with the movable member to detect frequency of rotations of the movable member.

According to the present invention, the maximum speed at the time of swinging is decided by applying a centrifugal force or an inertia force to the movable member in the swing speed determining device mounted on a sporting goods such as a bat or suited to the shape of a bat or the like, and by whether or not the movable member overcomes a supporting force set by the sliding adjustment of the magnet part and moves away from the support member, and the movable member rotates to come into contact with the stopper to produce a hitting sound to enable to decide whether or not the top speed position is proper.

BRIEF DESCRIPTION OF THE DRAWINGS

The device according to the present invention will be described hereinafter with reference to the accompanying drawings, in which.

DETAILED DESCRIPTION OF THE PREFERRED EMBODIMENTS

Figure 1:
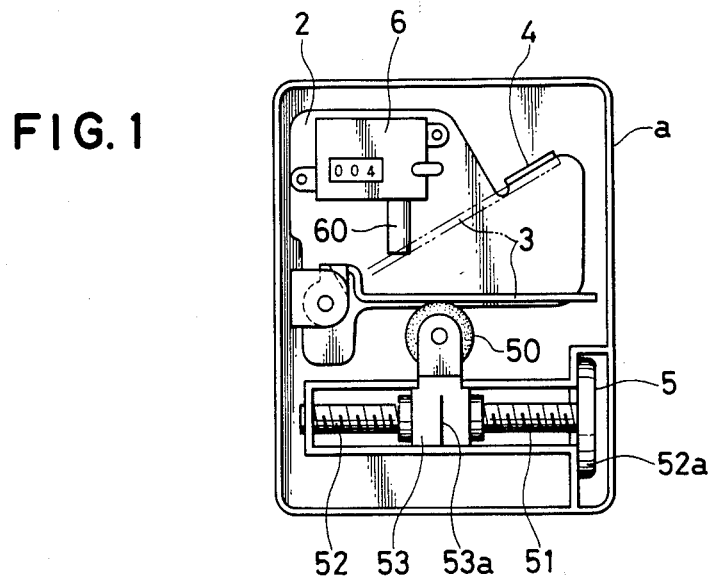
FIG. 1 is an explanatory view showing essential parts of one embodiment of a device for deciding swing speed according to the present invention.
Figure 2:
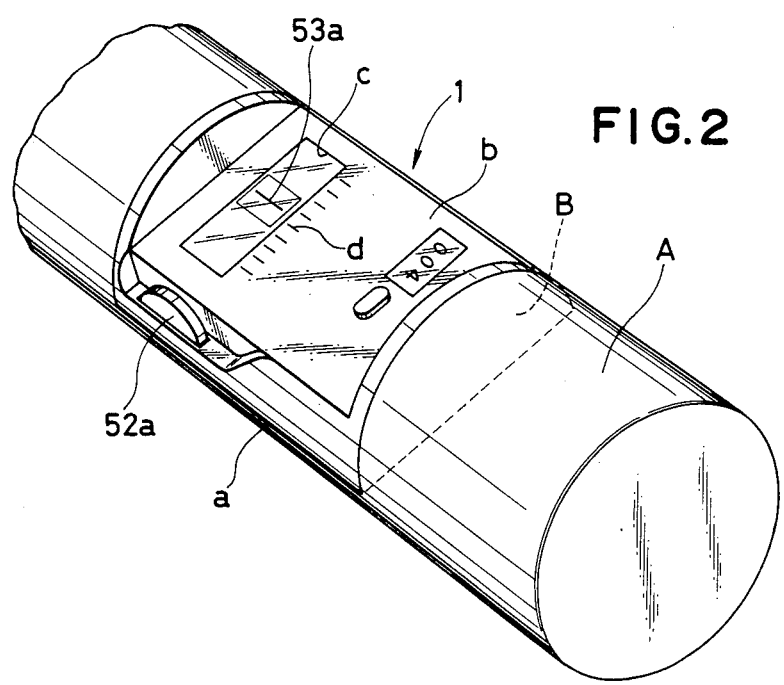
FIG. 2 is an explanatory view showing the using condition of the same embodiment.
Figure 3:
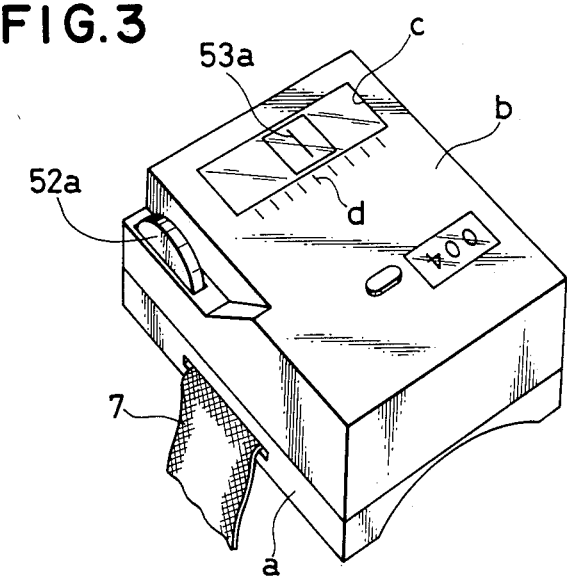
FIG. 3 is an explanatory view showing a further embodiment.
Figure 4:
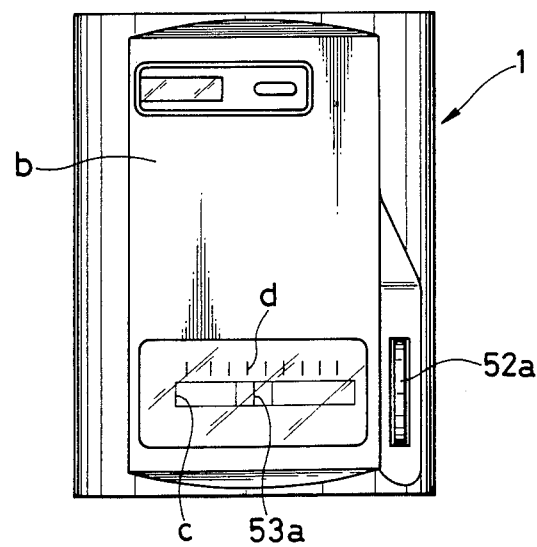
FIG. 4 is an explanatory view showing the upper surface of one embodiment.
Figure 5:
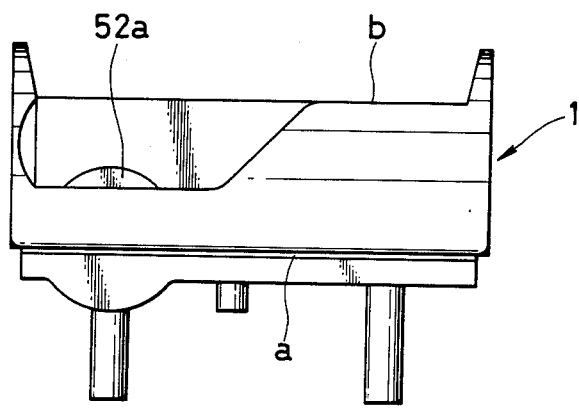
FIGS. 5 and 6 are respectively explanatory views showing the side of one embodiment.
Figure 6:
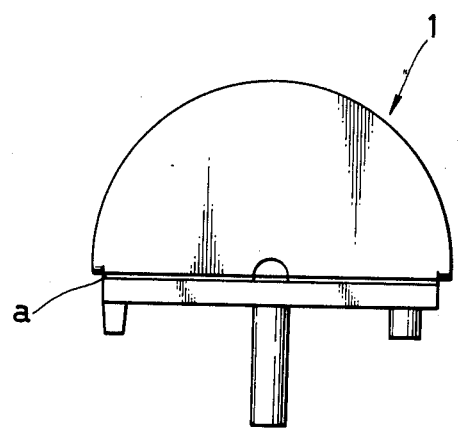
Figure 7:
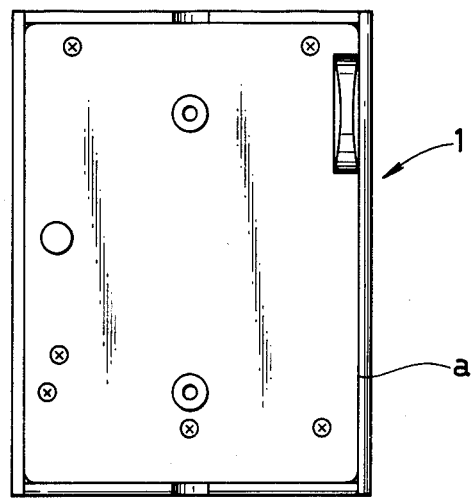
FIG. 7 is an explanatory view showing the bottom of one embodiment.
Figure 8:
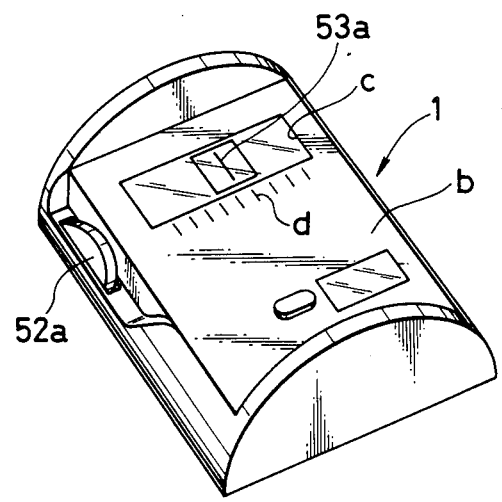
FIG. 8 is an explanatory view showing the state of one embodiment as viewed obliquely and upwardly.

The present invention will now be described in detail on the basis of the embodiments shown in FIGS. 1 to 8 in which the invention is applied to a bat shape.

A swing speed determining device is generally designated at 1, which has a dummy portion A suited to a bat shape. The device 1 is mounted in a depression B of the dummy portion A. A mounting base 2, a magnetic attractable movable member 3 in the form of a plate made from a metal, a stopper 4 erected from the mounting base 2 and a support member 5 are covered with a base plate a and a cover b.

As shown in FIG. 1, the movable member 3 has one end pivotally mounted on the mounting base 2 for rotation in a longitudinal direction of the dummy portion A; the support member 5 is opposed to the movable member 3 and comprises a magnet part 50 to which the movable member 3 is detachably attracted and an adjusting part 51; and the movable member 3 is provided rotatably through a limited rotational arcuate width between the stopper 4 and the support member 5.

The magnet part 50 is constructed such that a metal disk is held by a disk-like magnet, the magnetized metal disk attracting the movable member 3. The adjusting part 51 has a screw rod 52 whose head 52a is exposed to the cover b. The magnet part 50 is rotatably supported through a connector 53 threadedly engaged with the screw rod 52. The magnet part 50 to which the movable member 3 is attracted is not in sliding contact with the movable member 3 but the magnet part 50 is guided lengthwise of the movable member 3 by rotation of the screw rod 52 and can be smoothly moved in a pointcontact fashion between the pivot of the movable member and the end thereof.

The upper portion of the connector 53 of the adjusting part 51 corresponds to a window c open to the cover b, and the swing speed which is a target can be set from graduations d provided around the window and a pointer 53a provided on the upper surface of the connector 53. That is, the pointer 53a is adjusted to the value of speed on the target graduations, the screw rod 52 is rotated to vary the position of the magnet part 50 in contact with the movable member 3, and the retaining force applied to the movable member is varied. While in this embodiment, the magnet portion is provided so that the former may be moved by rotation of the screw rod, it is to be noted that a magnet portion can be connected to a support movably mounted along the window c, and the support may be directly moved to thereby set the position of the magnet portion.

Reference numeral 6 designates a counter. A lever 60 is disposed in the rotational range of the movable member 3, and the movable member 3 comes into contact with the lever 60 to thereby detect numerical frequency of the rotations of the movable member.

In determining the swing speed using the swing speed present determining device having the above-described construction, the movable member 3 is attracted by the magnet portion 50, and when the centrifugal force applied to the movable member 3 at the time of swinging overcomes the retaining force of the magnet portion 50 set at the distance from the pivot of the movable member 3 by the sliding adjustment of the magnet portion, the movable member 3 is disengaged from the support member 5 and comes into contact with the stopper 4 to produce a hitting sound. Then, it is determined that the swing speed exceeds the speed (graduations) indicated by the pointer 53a. If the retaining force of the magnet portion 50 is greater than the centrifugal force, that is, if the swing speed is less than the set speed which is a target, the movable member 3 is not disengaged from the support member 5. Then, it is decided that the swing speed (the maximum speed) is less than the set speed.

Since the movable member 3 comes into contact with the stopper 4 to produce a hitting sound, it is possible to judge at what part of the swinging orbit the speed reached the maximum value, and comparison between the speed-change as a model of a predetermined standard and the speed-change at the time of swinging may also be effected.

While in one embodiment, the form suited to the shape of a bat has been used, it is to be noted that the present invention is not limited thereto but if a lower-surface surface configuration of the base plate a is made to correspond to an outer-surface configuration of a sporting goods, for example, a bat, a stop 7 such as a belt can be used, without use of the dummy suited to the shape of the goods, to firmly mount it to the goods. The device may be mounted on not only the bat but also other various goods.

As described above, according to the present invention, the movable member is provided rotatably through the rotational width between the support member and the stopper, and the movable member is detachably attracted on the magnet portion of the support member, the magnet portion being guided lengthwise of the movable member. Therefore, the device of the present invention is very simple in construction and easy in handling as compared with the conventional speed measuring apparatus. Moreover, if the device is mounted directly on the goods such as a bat, the swing speed can be decided easily and promptly merely by swinging. Furthermore, the maximum speed position of the swing may be easily found by the hitting sound; it can be judged at what position of the swinging orbit the speed reached the set speed or more; and comparison between the speed-change as a model and the speed-change at the time of swinging can be made, thus being useful for making a swing form. In addition, the device has practically excellent advantages in that the device is simple in construction, which allows the device to be formed at less cost and with small size; and even if the goods with the device attached thereto is swung, there constitutes no obstacle to swinging operation, and the like.

What is claimed is:

1. A device for determining the swing speed of rotatable objects, comprising a mounting base, a magnetically attractable movable plate member, said movable plate member pivotally mounted at one end on said mounting base, a stopper provided in the path of said movable member at one rotational arcuate direction thereof, whereby said movable member may come into contact with the stopper to produce a hitting sound, a transversely movable support member which is set in the path of the other rotational arcuate direction of said movable member, said support member supporting a magnetized disk to which said movable member is detachably attracted, whereby upon presetting the magnetized disk may be moved in a transverse longitudinal direction, relative to the pivot of the movable member, said movable member having an arcuate limit of specific rotation between said stopper and said support member.

2. A device for deciding swing speed according to claim 1, including a lever actuated counter which comes into contact with the movable member to detect numerical frequency of rotations of the movable member.

* * * * *